United States Patent [19]

Hieb

[11] 3,993,249
[45] Nov. 23, 1976

[54] IRRIGATION SYSTEM
[76] Inventor: Arthur J. Hieb, 501 18th St., Rupert, Idaho 83350
[22] Filed: Nov. 29, 1974
[21] Appl. No.: 528,051

[52] U.S. Cl. ............................. 239/177; 137/344; 239/191
[51] Int. Cl.² ........................................ A01G 25/09
[58] Field of Search ........... 239/155, 159, 177, 178, 239/191, 192, 212, 213; 137/344

[56] References Cited
UNITED STATES PATENTS

| | | | |
|---|---|---|---|
| 3,001,721 | 9/1961 | Zybach | 239/177 |
| 3,353,751 | 11/1967 | Dowd | 239/177 |
| 3,623,663 | 11/1971 | Koinzan | 239/177 |
| 3,687,373 | 8/1972 | Cornelius | 239/191 |
| 3,704,827 | 12/1972 | Moulton | 239/177 |

*Primary Examiner*—Evon C. Blunk
*Assistant Examiner*—Andres Kashnikow

[57] ABSTRACT

An orbital irrigation system employing a rotatable pivot head, as a supply take-off, comprises a sprinkler conduit issuing horizontally from the pivot head; the sprinkler conduit including a multiplicity of distally disposed sprinkler heads, the sprinkler conduit being carried by wheel sets disposed at intervals along the length of the sprinkler conduit, the wheels set being provided with a gear box driven by a water motor for providing mechanical rotation to the gear box and dispensing a spray of water supplied from the sprinkler conduit, horizontal and lateral stressing including a multiplicity of spars issuing transversely at intervals from the sprinkler conduit, and a cable fastened to the conduit at a point distally from the pivot over terminal ends of the spars and to alternate bases of the spars at the conduit, and a drive carriage assembly mounted distally from the terminal end of the sprinkler conduit opposite the pivot.

6 Claims, 6 Drawing Figures

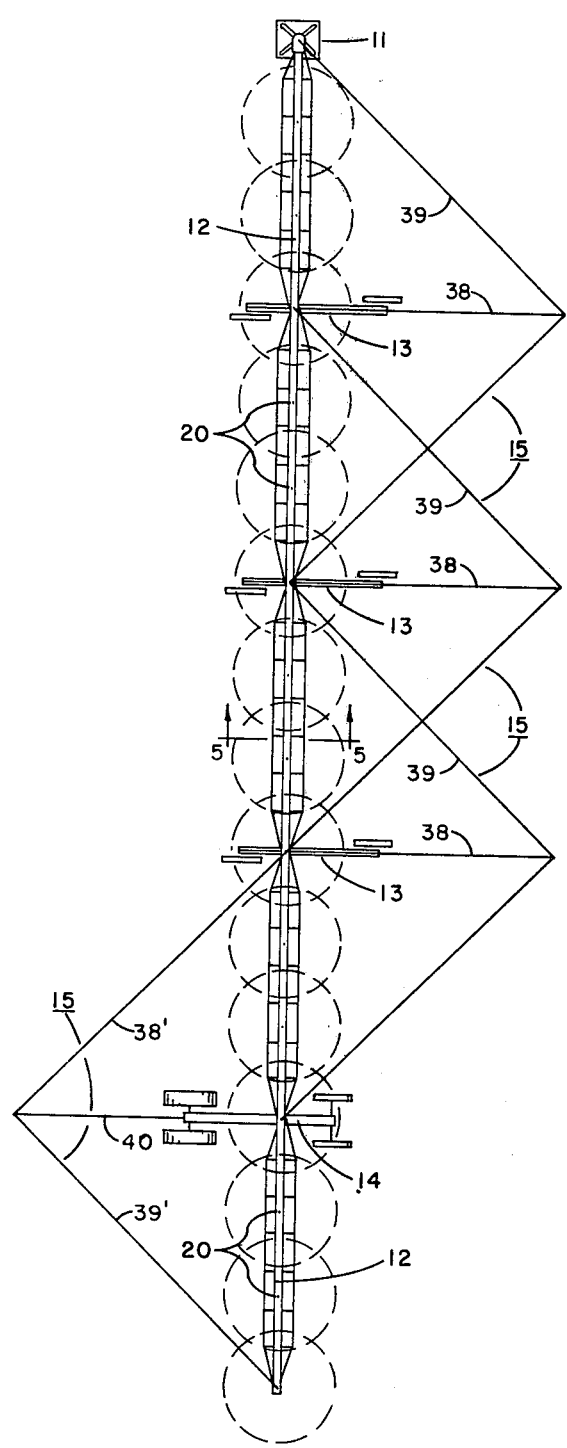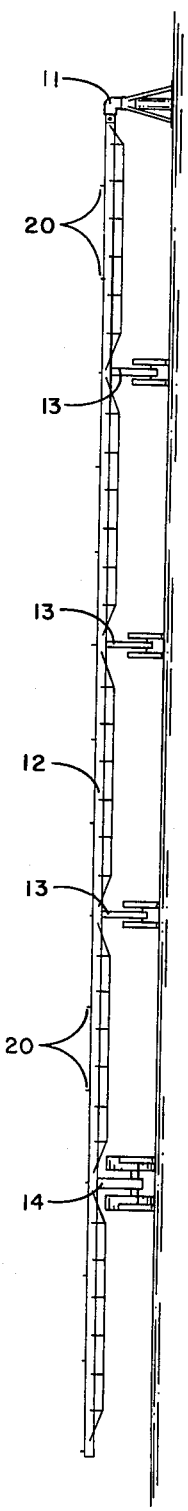
PLAN
FIG. 1
ELEVATION
FIG. 2

IRRIGATION SYSTEM

FIELD OF THE INVENTION

The present invention relates to irrigation systems, and more particularly to an improved fixed point orbital irrigation system.

DESCRIPTION OF THE PRIOR ART

Orbiting irrigations systems generally refer to irrigation systems having a central pivot and a supply pipe carrying water dispensing sprinklers mounted at intervals along the pipe; the pipe being operable to pivot on the fixed point in a circular pattern. Extremely long reaches have been achieved by this system. However, such systems have as inherent problems synchronously driving the conduit about the pivot point, stressing the conduit against distortion and providing the conduit with stressing, which though sufficiently strong, may undulate with the ground. The first problem has generally been treated by interconnecting supporting wheel sets to a single drive means. This results in a structure of extreme complexity and weight. With respect to stressing against torsion due to the orbiting path, irrigation systems of the prior art have employed vertical towers having guy-wire-type rigging. Such rigging does very little to the horizontal-lateral torsion which is the main component distorting the supply conduit. Because the system is vertically biased, the conduit accordingly is rigid with respect to undulations in terrain, and the system must be bifurcated at intervals to accommodate such undulations. Heretofore, what horizontal-lateral stressing has been provided has subsumed that the conduit must be biased equally in both directions, even though the conduit usually orbits in only one direction. This generally results in an insufficiently biased system with respect to weight and material, or at least superfluous structure.

Accordingly, it is an object of the present invention to provide an improved orbital irrigation system.

It is a further object of this invention that the aforesaid orbiting system employ a primary-motivating-drive assembly, and minor synchronizing drive assemblies in intermediate wheel sets.

It is a corollary object that synchronizing drive means in the wheel sets be driven from water under pressure from the supply conduit, and water employed be dispensed as irrigation water.

It is still another object of this invention that the present irrigation system be primarily biased against the direction of rotation of the supply conduit. It is a corollary object of the present invention that the system be of a relatively low profile.

These and other objects shall become apparent from the description following, it being understood that modifications may be made without affecting the teachings of the invention here set out.

SUMMARY OF THE INVENTION

An orbital irrigation system employing a rotatable pivot head as a supply take-off comprises a sprinkler conduit issuing horizontally from the pivot head; the sprinkler conduit including a multiplicity of distally disposed sprinkler heads, the sprinkler conduit being carried by wheel sets disposed at intervals along the length of the sprinkler conduit, the wheels set being provided with a gear box driven by combination means for providing mechanical rotation to the gear box and for dispensing a spray of water supplied from the sprinkler conduit, horizontal and lateral stressing including a multiplicity of spars issuing transversely at intervals from the sprinkler conduit, and a cable fastened to the conduit at a point distally from the pivot over terminal ends of the spars and to alternate bases of the spars at the conduit, and a drive carriage assembly mounted distally from the terminal end of the sprinkler conduit opposite the pivot.

BRIEF DESCRIPTION OF THE DRAWINGS

FIG. 1 is a top plan view of the irrigation system of this invention.

FIG. 2 is a elevational view of the apparatus of the FIG. 1.

DETAILED DESCRIPTION OF THE PREFERRED EMBODIMENT

Figures 3, 4:
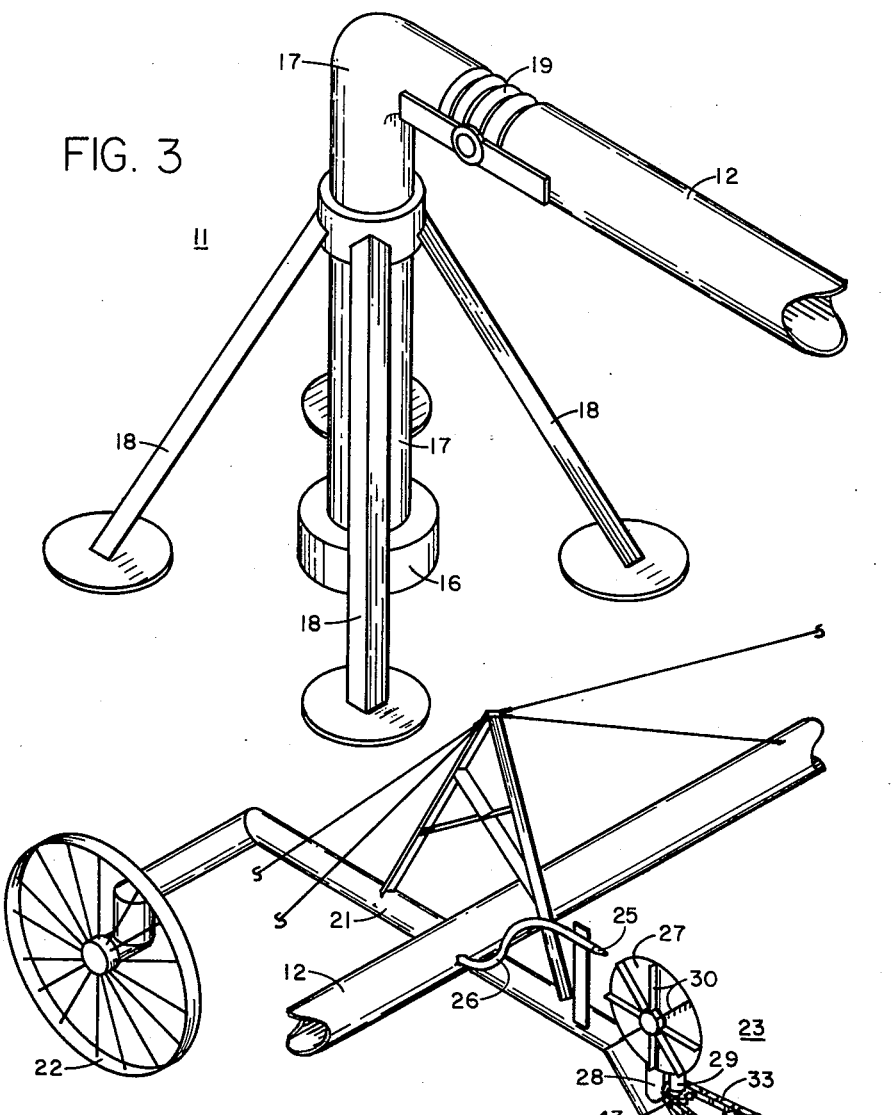
FIG. 3 is a perspective view of a typical pivot head assembly of this invention drawn to a larger scale.
FIG. 4 is a prospective view of a typical wheel set assembly of this invention.

Referring now to the drawings and more particularly to FIGS. 1 and 2, the irrigation system of this invention is shown to advantage and generally identified by the numeral 10. The system 10 comprises a pivot head 11, a sprinkler conduit 12, idling wheels 13, a carriage drive assembly 14, and a stressing system 15. The system 10 employs a rotatable pivot head as the supply take-off. Accordingly, the pivot head 11 is provided with water under pressure from a well or other supply system. As shown in the FIG. 3, the pivot head 11 includes a rotatable collar 16, a standpipe 17 issuing upwardly from the collar 16, diagonal bracing 18 journally supporting the standpipe 17, and a vertically pivotable coupling 19 which forms an ell for the horizontally disposed conduit 12, and permits deflection of the conduit 12 with respect to the standpipe 17 according to undulations and terrain.

Referring again to the FIG. 1, the sprinkler conduit 12 carries a multiplicity of sprinkler heads 20, and is carried by the wheel sets 13 and the carriage assembly 14. The sprinklers 20 may be selected from any of a variety of types, including oscillating and rotating jet types. The carriage assembly 14 is mounted distally from the end opposite the pivot head 11 to the conduit 12. The wheel sets 13 are mounted at intervals along, and of, the sprinkler conduit 12. As shown in the FIG. 4, each wheel set 13 comprises an A-frame 21 mounted transversely to the conduit 12, wheels 22 journally mounted at the lower, terminal ends of the A-frame 21 transversely with respect to the conduit 12, and a drive assembly 23. The wheels 22 may be of the cleated type. One of the wheels 22 is mounted with a right-angle gear box 24 having a horizontal shaft 24' by which the wheel 22 is mounted to the A-frame 21, and an upstanding shaft 24''. The drive assembly 23 comprises a nozzle 25 supplied with water under pressure from the conduit 12 through a hose 26. The nozzle 25 is directed at a vertical propeller plate 27 journally mounted on a web 28 fastened to the A-frame 21, by means of a journaled geared shaft 29. The propeller plate 27 is provided with a plurality of radially disposed blades 30 against which the nozzle 25 operates. It has been found to advantage to mount the nozzle 25 and propeller plate 27 so that the resulting jet is overshot with respect to the blades 30. The shafts 24" and 29 are provided with sprockets 43 and 32 which are aligned, and connected by a chain 33. In operation, the jet discharged from the nozzle 25 is directed at blades 30 of the propeller plate 27 causing the propeller plate 27, its shaft 29 and the gear box 24 to rotate, thus, driving the wheel 22 and the wheel set 13. It has been found to advantage to provide a flow to the nozzles 25 such that the resultant rotation of the wheels 22 are synchronous with respect to the rectilinear axis of the conduit 12 and parallelly to the drive assembly 14. It may be seen that the wheel sets both provide drive means and means for dispensing a substantial amount of water.

Figure 5:
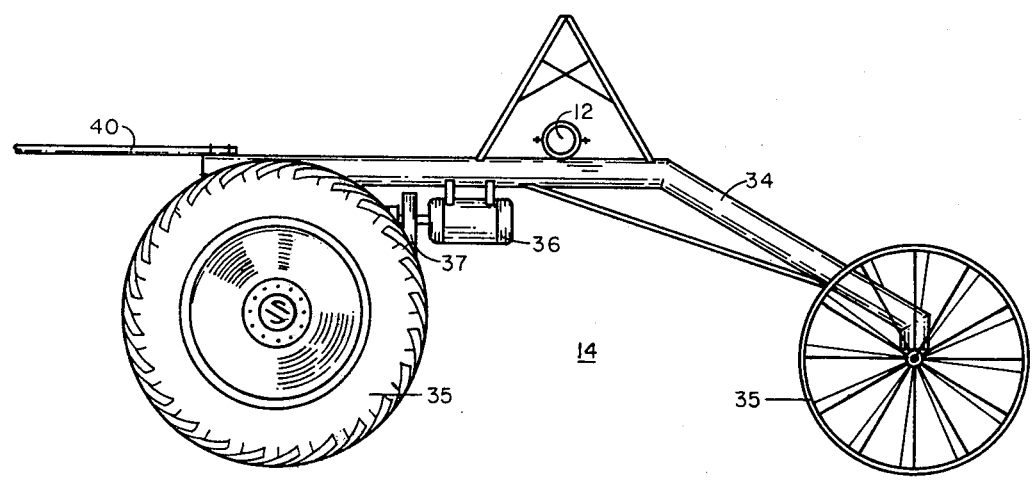
FIG. 5 is a cross-sectional view taken substantially along the lines 5—5 of the FIG. 1 showing a typical rule set of this invention.

Referring again to the FIG. 1, the drive carriage assembly 14 provides the principal motivating force for the system 10 about the pivot head 11. As shown more clearly in the FIG. 5, the carriage assembly 14 comprises a frame 34 having transversely disposed wheels 35, and a motor 36 mounted in the frame 34 and connected to the wheels 35 by a transmission 37. As above, the motor 36 in the transmission 37 should be moderated to be synchronous with the wheel sets 13. The motor 36 may be an internal combustion engine or a hydraulic motor.

Figure 6:
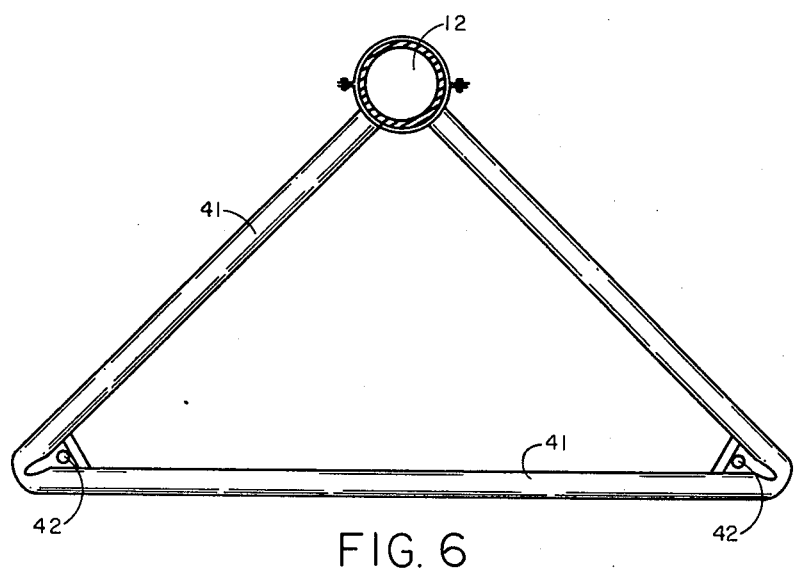
FIG. 6 is a cross-sectional view of a typical triangular reinforcing frame employed herein.

Referring again to the FIG. 1, the horizontal, lateral stressing 15 is operable to bias the conduit 12 against torsion created by motion of the conduit 12 about the pivot head 11. The stressing 15 comprises a multiplicity of horizontally, transversely, substantially, equidistantly disposed spars 38 which issue rearwardly at intervals along the conduit 12 with respect to rotation of the conduit 12. Each of the spars 38 is supported by a cable 39 which is shackled to the conduit 12 substantially at the connection of the pivot point 11 and at the connection of the spars 38 with the conduit 12 in a crossbraced pattern. It may be seen that this bow-string configuration results in a quite rigid space structure having an extremely low profile. The outermost terminal ends may be provided with a forwardly projecting spar 40 having a cable 38' connected with one of the rearwardly projecting spars 38 and the outermost terminal end of the conduit 12. The spar 40 and the cable 39' prevent backlash and permit the cantilevered outer end portion of the conduit 12 to move with less distortion. As shown in the FIG. 6, the conduit 12 may have an under bracing comprising a multiplicity of transversely disposed triangular frames 41 having their apexes fastened to the conduit 12 and a multiplicity of cables 42 connecting the parallel lower or base vertexes of the frames 41 parallel with the conduit 12.

It has been found that the present invention does not display side distortion characteristics of irrigation systems of its class. This is attributable to the assisting drive means carried in the idling wheels 13. It is also attributable to the stressing 15 which permits flexibility over undulations in terrain, while bracing usual torsion in the supply conduit 12. This permits synchronizing mechanisms, joints and interconnecting drive shafts of the prior art to be deleted, and an extremely long structure of great simplicity to result.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. An orbital irrigation system employing a rotatable pivot head as a supply take-off, comprising:
    a sprinkler conduit issuing horizontally from said pivot head, said sprinkler conduit including a multiplicity of distally disposed sprinkler heads, said sprinkler conduit being carried by wheel sets disposed at intervals along the length of said sprinkler conduit, each wheel set comprising an A-frame mounted at its apex transversely to said conduit and wheels journally mounted at the lowermost terminal ends of said A-frame, at least one of said wheels being provided with a gear box driven by combination means for providing mechanical rotation to said gear box and for dispensing a spray of water supplied from said sprinkler conduit, horizontal and lateral stressing including a multiplicity of spars issuing transversely at intervals from said sprinkler conduit, and cable fastened to said conduit at a point distally from said pivot over terminal ends of said spars to alternate bases of said spar at said conduit; and
    a drive carriage assembly including a frame mounted distally from the terminal end of said sprinkler conduit opposite said pivot, wheels disposed transversely to said supply conduit mounted to said frame, and a motor and transmission mounted on said frame and mechanically connected to said wheels.

2. The apparatus of claim 1 wherein said combination means for providing mechanical rotation and for dispensing a spray of water comprises a jet supplied with water from said sprinkler conduit mounted on a post and a bladed wheel whose shaft is mechanically connected to said gear box driving said wheel set with said blades intercepting said jet of water at a predetermined point.

3. The apparatus of claim 1 wherein said spars being mounted at the same points on said sprinkler conduit as said wheel sets.

4. The apparatus of claim 3 wherein said wheel sets and said drive carriage are disposed at substantially equal intervals over the length of said sprinkler conduit.

5. The apparatus of claim 1 wherein a portion of said sprinkler conduit is cantilevered from said drive carriage, and said drive carriage is provided with a forwardly horizontally and transversely disposed spar provided with a cable fastened to said cantilevered terminal end over the terminal end of said spar and connected at the base of the next adjacent rearwardly disposed spar.

6. The apparatus of claim 1 including underbracing comprising triangular frame members fastened at their upper apexes transversely at intervals to said supply conduit, and the respective lower apexes of said frame members being connected to cables under tension.

* * * * *